A. A. HORTON.
ADDING MACHINE.
APPLICATION FILED AUG. 30, 1915.

1,243,839.

Patented Oct. 23, 1917.
6 SHEETS—SHEET 1.

Fig. 1.

Witnesses

Inventor

A. A. HORTON.
ADDING MACHINE.
APPLICATION FILED AUG. 30, 1915.

1,243,839.

Patented Oct. 23, 1917.
6 SHEETS—SHEET 4.

A. A. HORTON.
ADDING MACHINE.
APPLICATION FILED AUG. 30, 1915.

1,243,839.

Patented Oct. 23, 1917.
6 SHEETS—SHEET 6.

UNITED STATES PATENT OFFICE.

ALLEN A. HORTON, OF DETROIT, MICHIGAN, ASSIGNOR TO BURROUGHS ADDING MACHINE COMPANY, OF DETROIT, MICHIGAN, A CORPORATION OF MICHIGAN.

ADDING-MACHINE.

1,243,839.  Specification of Letters Patent.  Patented Oct. 23, 1917.

Application filed August 30, 1915.  Serial No. 48,006.

*To all whom it may concern:*

Be it known that I, ALLEN A. HORTON, a citizen of the United States, residing at Detroit, in the county of Wayne and State of Michigan, have invented certain new and useful Improvements in Adding-Machines, of which the following is a specification.

This invention relates to that type of adding or calculating machine which is illustrated in my prior Patent, No. 1,016,501, issued February 6, 1912, and has to do more particularly with the matter of resetting register wheels to zero. It is customary in this class of machines to reset wheels to zero by forward turning of the wheels, higher order of wheels being advanced to the "9" position and the units wheel to "0" whereby there is inaugurated a successive transfer or carrying action for turning all of the other wheels from "9" to "0". This operation is commonly accomplished by reciprocation of a handle with which the machine is equipped for the purpose, and one reciprocation of such handle will suffice. It is a habit however with some operators to reciprocate the handle twice with the idea of making sure that the complete zeroizing is accomplished. But this practice may result otherwise for it has been found possible to so quickly execute a second stroke of the handle as to interfere with the successive transfer or carrying action and the effect upon the wheels is to cause one or more of them to exhibit the numeral "1," for the reason that the interrupted carrying impulse which should be received by the wheel as the handle completes its return stroke in the first reciprocation, will be transmitted to that wheel during the quickly succeeding advance stroke of the handle when the wheel is again being turned to the "9" position and the wheel will in consequence be advanced to "0" and will afterward receive the second carrying impulse which will move it on the "1" position. Or in a somewhat different style of machine of the same general type (in fact the particular style of machine to which I here show my invention applied) similar erroneous effects will be due to a wheel remaining at the zero position instead of being again advanced to the "9" position by the second stroke of the handle, so that when the carrying impulse is transmitted upon return of the handle this wheel will advance from "0" to "1". Of course if adding operations are then pursued an erroneous result will be had, the wheels not having all been at "0" when these operations started.

One object of the present invention is to prevent the possibility of such erratic action in a zeroizing operation, and I accomplish this object by putting the zeroizing handle under the control of the wheel of highest order so that no second stroke of the handle can be executed until that highest order wheel has absorbed the carrying impulse which marks the termination of the successive action necessary for completion of a zeroizing operation.

Erroneous results may also come about through depression of amount keys during the zeroizing operation, and as a further safe-guard I provide interlocking devices between the amount keys and the zeroizing handle which will prevent simultaneous use of these manipulative elements of the machine.

In the drawings which accompany and form part of this specification Fig. 3 is a view somewhat similar to Fig. 2 but illustrates a key-locked condition with the zeroizing handle partly operated.

While as hereinbefore stated the present invention relates to the type of adding or calculating machine disclosed in my aforesaid prior patent, the particular machine I have here chosen for purposes of illustrating a concrete embodiment of my invention, corresponds more closely with the machine illustrated in the later patent of C. W. Gooch, No. 1,128,679, issued February 16, 1915. Reference may be had to this Gooch patent for the details of the carrying mechanism and the particular action thereof and also the manner in which it lends itself to the performance of the zeroizing. The construction here shown for transmitting primary impulses from the keys to the register wheels differs from that illustrated in my said prior patent and said Gooch patent, and conforms to that illustrated in my prior Patent No. 1,156,600, issued October 12, 1915.

The keys F here shown operate as do the similarly designated keys of said last mentioned construction to varyingly depress a column actuator or actuating lever A which is fulcrumed at the rear upon a bell crank lever B. The forward end of the actuator lever A, is connected by a link, A', to a stop bar, D, which at the rear end is coupled to said bell crank, B, and which at this forward end is coupled to a gear segment, E. The latter is in mesh with a pinion, E', which through ratchet and pawl mechanism operates the intermediate gear wheel E² that drives the gear wheel L corresponding with that similarly designated in my said Patent No. 1,016,501.

Referring next briefly to the carrying mechanism which is that illustrated in said Gooch Patent, No. 1,128,679, the reference letter G designates the cams upon the respective numeral wheels; the reference letters N and O designate the carrying gear pinions, P, the sun gear with which the pinion, O, meshes; and I, the internal gear with which the pinion N meshes. L', designates the gear carrier or oscillating support for the pinions N and O, and H designates an arm or lever geared to said carrier as in the construction illustrated by Figs. 10, 11 and 12, of said Gooch patent.

The Gooch patent includes zeroizing mechanism as adapted to the construction shown in other figures of the drawings of that patent, and so the zeroizing mechanism I here show in connection with the modified carrying mechanism of Figs. 10 and 12 of the Gooch patent differs somewhat from the zeroizing mechanism of the latter, and I shall therefore describe it in some detail, though the principle of operation is precisely the same as that in the Gooch construction, involving the swinging of the gear carriers L by the levers H through operating connections with the zeroizing handle Z', while the internal gears I are locked. According to the present construction the levers H are formed with downwardly extending arms H', and forwardly extending arms W, secured to a rock shaft X, carry rollers, $w$, $w'$, to operate upon the forward edges of said lever arms H'. The roller $w$ of the units order is of slightly larger diameter than the other rollers $w'$ for the purpose of advancing the units wheel to "0," while the higher order wheels advance to the "9" position. The rock shaft X corresponds with that similarly designated in the Gooch patent and it is operatively connected to the handle Z' substantially as there shown, the connection comprising a crank arm X' on the shaft X and spring-connected links X² between that crank arm and a crank arm Y' on the handle shaft. The arms W of the rocking structure, which comprises the shaft X and said arms W, carry roller studs X⁴ which occupy cam slots of levers U for locking the internal gears I through engagement with pins or studs $e$, thereon. Integral with the levers U are arms U' which enter the paths of pins or studs A³ on the numeral wheels to prevent overthrow thereof in the zeroizing operation.

Figure 1:
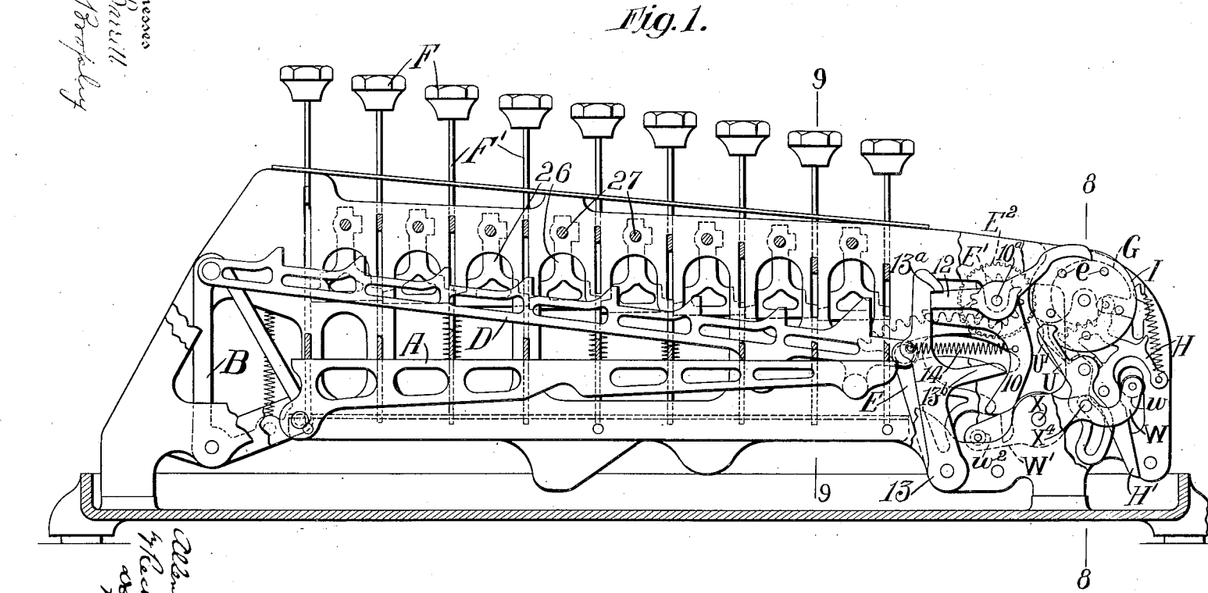
Figure 1 represents a complete machine minus its inclosing casing and with its interior mechanism for the most part in left side elevation, the supporting frame work being broken away and some few parts correspondingly appearing in section.
Figure 2:
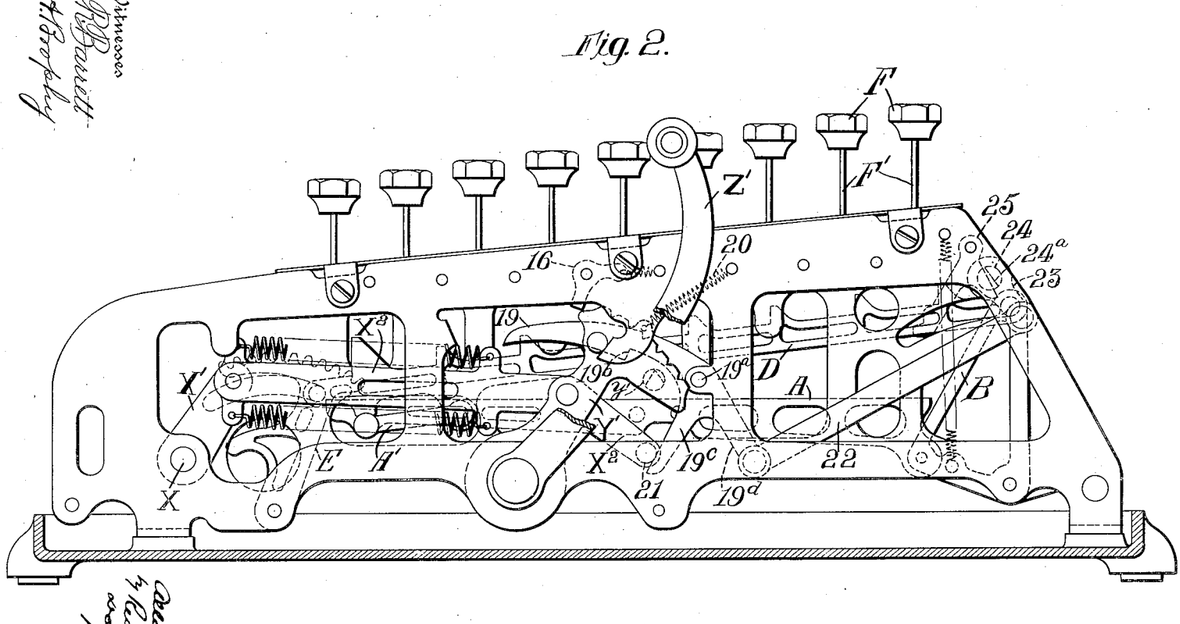
Fig. 2 is a similar right side elevation of the machine and in both of these figures the parts appear in normal condition.
Figure 6:
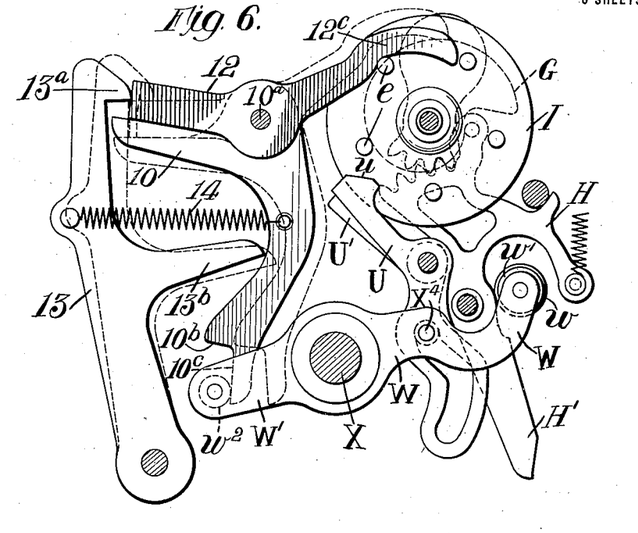
Fig. 6 is a left side elevation, on a somewhat enlarged scale, of parts appearing at the right of Fig. 1, Fig. 6 showing the normal condition by dotted lines and a handle locking condition by full lines.

The normal condition is illustrated in Figs. 1 and 6 where it will be seen that the rollers $w$ and $w'$ are at the hub portions of the arms H and the locking and overthrow preventing arms U and U' are retracted.

It will of course be understood that the effect of pulling forward the zeroizing handle Z' is to rock down the arms W, and it will be understood that the first effect is to lock the internal gears I against their tendency to rotate in a counter-clockwise direction, and then the rollers $w$ and $w'$ rock the levers H advancing the wheels (the units wheel to the "0" position and the other wheels to the "9" position), and then with the return of the zeroizing handle and upward swing of the arms W, the internal gears I will be unlocked and the several levers H will spring back and the necessary carrying impulses will be transmitted to complete the zeroizing.

Now the second stroke of the zeroizing handle may be so quickly executed as to cause the carrying action of the levers H to be interfered with. In such case one or more higher order numeral wheels would be left standing at the "9" position, and the lever H to the left of the wheel last to receive a carrying impulse would be blocked, with the result that the second forward stroke of the zeroizing handle would not again advance this wheel to the "9" position but it would be left at "0." Consequently with the conclusion of this second forward stroke of the zeroizing handle, wheels to the right of that particular one above referred to, would show "9s" (except that of course the units wheel would show "0"), and the wheels to the left would still be standing at the "9" position as left in the preceding stroke of the zeroizing handle. Then with the return of the zeroizing handle after its second forward stroke, the carrying impulse would be transmitted across the series of wheels and the one standing at "0" would advance to the "1" position.

Figure 7:
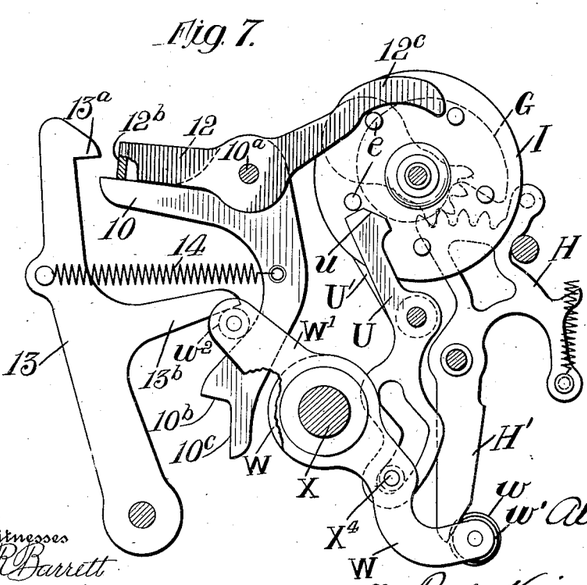
Fig. 7 is a similar view illustrating the effect of the initial stroke of the zeroizing handle.
Figure 8:
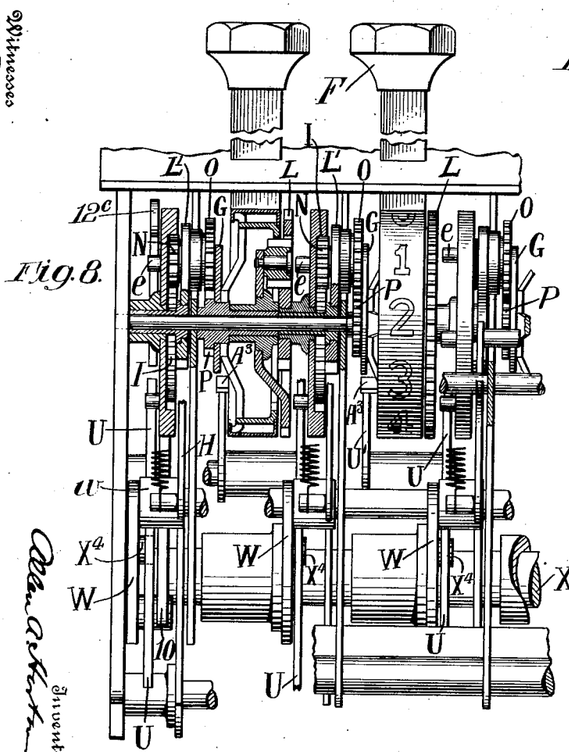
Fig. 8 is a partial vertical cross section taken substantially on the line 8—8 of Fig. 1.
Figure 9:
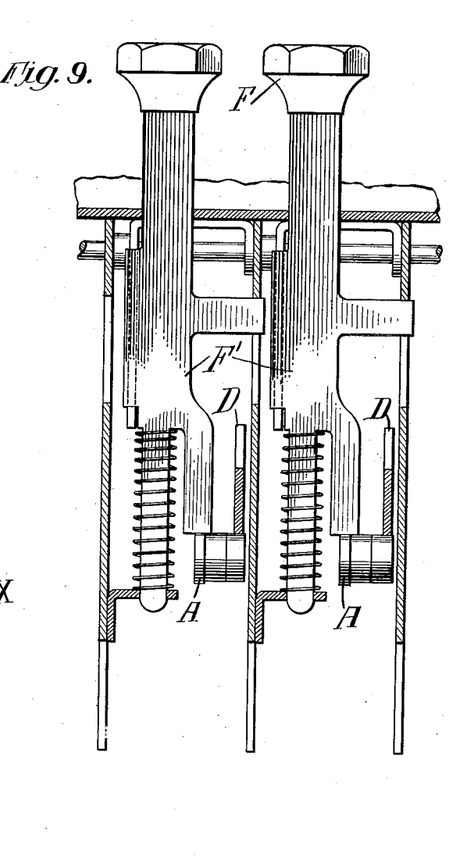
Fig. 9 is a partial vertical section taken substantially on the line 9—9 of Fig. 1.

Passing now to the devices supplied by my present invention for preventing such misoperation as above referred to, and referring particularly to Figs. 1, 6 and 7, the internal gear I there illustrated is one to the left of the wheel of highest order, in which connection also see Fig. 8. I utilize the stop studs or pins $e$, of this wheel I to control a handle-locking mechanism through which a second stroke of the zeroizing handle is prohibited unless the carrying impulse inaugurated by the preceding stroke of said handle has been permitted to pass through the series of wheels and take effect fully upon the wheel of highest order; which means that the said internal gear is given one-fifth of a rotation in a clockwise direction.

The said locking mechanism comprises a locking lever 10 of bell crank form hung upon a frame cross rod $10^a$, the depending arm of said lever having a terminal notch or shouldered formation to coöperate with a roller stud $w^2$ on a rearwardly extending arm $W'$ integral with the left-most one of the series of arms W. Normally the horizontal shoulder $10^b$ of the locking lever 10 is forward of the path of movement of said roller stud, as shown in Fig. 1 and by dotted lines in Fig. 6. The locking lever is normally restrained by the rearwardly extending arm of another lever 12 hung upon the said cross rod $10^a$, said last mentioned lever arm being engaged by the hook $13^a$ of a latching lever 13 which is pivoted upon a lower cross rod of the machine frame. A spring 14 connects this latching lever to the depending arm of the locking lever 10 and thus tends to swing the latter arm rearward and pull the latching lever forward. The rearwardly extending arm of the lever 12 is turned laterally to engage over the rearwardly extending arm of the lever 10, and the latch hook $13^a$ engages over this laterally turned end portion $12^b$ of the lever 12. The forwardly extending arm of the lever 12 takes the form of a cam finger $12^c$ which coöperates with the pins or studs $e$, on the internal gear I. Normally this cam finger is raised out of the path of said studs, as shown in Fig. 1 and by dotted lines in Fig. 6.

When the zeroizing handle is pulled forward and the arm $W'$ thereby swung upward its roller stud $w^2$ operates upon a prong $13^b$ of the latch lever 13, disengaging the hook $13^a$ from the lever 12, whereupon the spring 14 rocks the lever 10 rearward, and the cam finger $12^c$ drops upon one of the studs $e$, spanning the distance between that stud and the next one to the right as shown in Figs. 6 and 7. When the zeroizing handle is released and makes its return stroke, the roller $w^2$ wipes over the rear edge of the lever 10 but the latch hook $13^a$ strikes against the now elevated end-flange $12^b$ of the lever 12, the latter being over-weighted on the forward side of its pivot. The spring 14 therefore swings the lever 10 back again as soon as the roller $w^2$ passes the horizontal shoulder $10^b$, and that shoulder takes up a position directly over the stud $w^2$ as shown in Fig. 6, the vertical shoulder $10^c$ of the lever 10 striking against said stud $w^2$ to limit the movement.

Now the one-fifth turning of the internal gear I in a clockwise direction which accompanies advance of the highest order wheel from "9" to "0", will restore the locking lever 10 to its normal ineffective position, this being effected by action of one of the studs $e$, upon the under edge of the cam finger $12^c$. Thereby the lever 12 is rocked and in turn rocks the lever 10 to the dotted line position shown in Fig. 6, whereupon the latch hook $13^a$ springs over the flange $12^b$. However, if a second stroke of the zeroizing handle is attempted to be executed before there has been time for a full transmission of the carrying impulse then it will be obvious that the said stud $e$, will not have traversed the under edge of the cam finger $12^c$ and the horizontal shoulder $10^b$ of the locking lever 10 will still be above the stud $w^2$, in consequence of which the rocking structure, comprising arms W and shaft X, will be blocked. The stroke of the handle $Z'$ may go on because of the distensible character of the link connection between the handle and said rocking structure. Then when the handle returns to normal and the pressure of the roller stud $w^2$ against the shoulder $10^b$ is relieved (said stud lowering away from the shoulder) the interrupted turning of the gear-disk I will proceed and the proper zeroized condition of the mechanism be brought about.

As the re-latching of the levers 12 and 10 might possibly occur just ahead of completion of the one-fifth turn of the wheel I, and an instantly ensuing second stroke of the zeroizing handle might in such case lock said wheel against continued movement to complete the one-fifth turn, (by causing engagement of the stop arm U with a wheel stud, $e$), said arm is beveled on the end as shown at $u$, so that in such a case it will act with a camming effect upon the stud and therefore, instead of obstructing the wheel, will promote its arrival at proper final position.

It will be obvious that the above described arrangement will effectively guard against misoperation through rapid successive pulling of the zeroizing handle. It is to be understood however that there may be considerable modification of this particular arrangement within the scope of my invention.

Referring next to the other feature of my invention to which allusion was made in the opening paragraph of this specification, I provide for prohibiting simultaneous use of amount keys and zeroizing handle by the following construction: The beforementioned crank arm Y' has a segmental upper portion for purposes of coöperation with a full-stroke pawl 16 of familiar character, and I mount in this segment a locking stud $y'$ as shown in Figs. 2, 3, 4 and 5. This stud coöperates with a latch-lever 19 which is pivoted intermediate its ends upon a frame stud $19^a$. This latch-lever has three branches, the upper one of which extends alongside the arm Y' and has a locking shoulder $19^b$ to coöperate with the locking stud $y'$. The normal condition is illustrated by dotted lines in Fig. 2, said shoulder being in the path of the stud but spaced from it. A spring 20 applied to this upper arm of the latch-lever tends to lift it and remove the shoulder from the path of the stud. This is normally prevented by the engagement of a stud 21 with the lower forward branch $19^c$ of the latch lever, said stud being carried by the rearward extension of one of the aforementioned links $X^2$. If the zeroizing handle is pulled forward when no amount key has been depressed, then the spring 20 lifts the latching arm of the lever 19 as the stud 21 moves forward, and unless the said handle is excessively speeded, the shoulder $19^b$ will be out of the path of the stud $y'$ by the time the latter advances to a position where otherwise it would strike the shoulder. The forward stroke of the zeroizing handle may therefore under such conditions proceed, the stud $y'$ traveling along the arcuate under-edge of a forward extension of the latching arm of the lever 19, as illustrated in Fig. 3.

Figure 4:
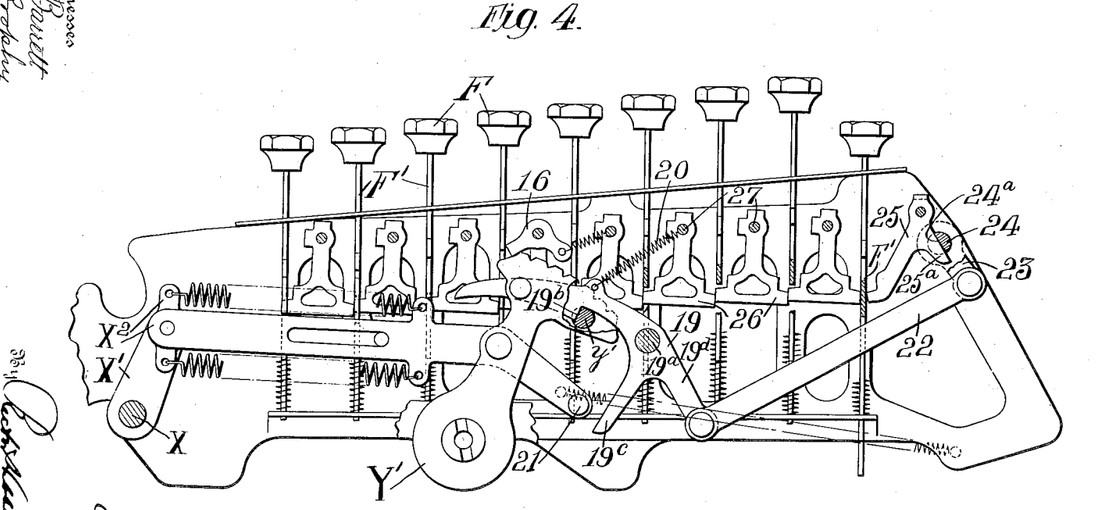
Fig. 4 shows the same parts as Fig. 3 but illustrates a reverse condition to wit,—that resulting from a depression of an amount key ahead of any attempted use of the zeroizing handle.
Figure 5:
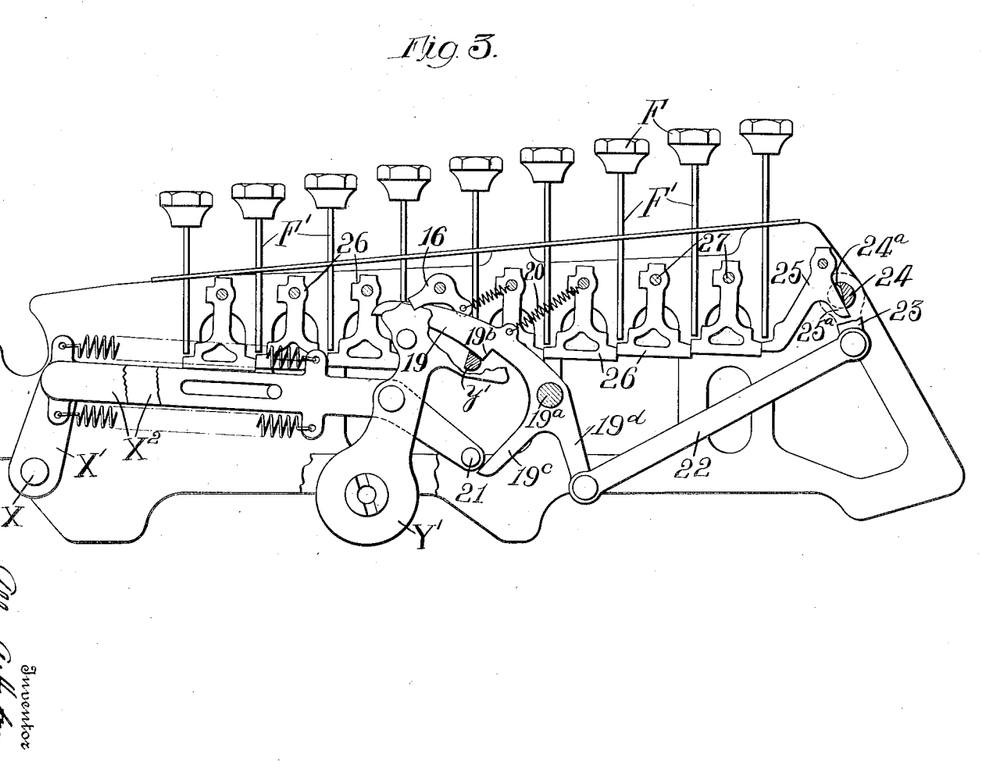
Fig. 5 shows in plan view some of the parts which appear in section and in right side elevation in Fig. 4.

A lower rear branch $19^d$ of said lever is connected by a link 22 to a depending crank-arm 23 secured to a rock shaft 24 which runs across the rear of the machine behind the key-board. This rock shaft is notched for each row of keys so as to provide a flattened face $24^a$ to coöperate with key-locking pieces, of which there is a set for each row of keys. Each set comprises a rear-most member 25 to coöperate directly with the rock shaft 24, and members 26, all in tandem relation. These members are in the form of plates hung from frame cross rods 27 and they have shouldered lower end portions abutting one another, and designed to swing below shoulders of the stems F' of the keys. The rear-most plate has a blade $25^a$ occupying the notch of the rock shaft 24. Under normal conditions the angular relationship between this plate and the flat face $24^a$ of the rock shaft is that illustrated by dotted lines in Fig. 2. It will be obvious that this relationship permits rocking of the shaft a limited extent in a clockwise direction without its being obstructed by the plate 25. Therefore the zeroizing handle may be operated, such permissible rocking of the shaft 24 being sufficient to provide for the lifting of the locking shoulder $19^b$ out of the path of the handle stud $y'$, as illustrated in Fig. 3. Or a key may be depressed displacing the plate 25 as illustrated in Fig. 4. Both things, however, cannot occur at the same time, for it will be obvious that with the plate 25 displaced as in Fig. 4, its blade $25^a$ has assumed such relation to the flat face $24^a$ of the rock shaft as to block movement of the latter. On the other hand if the zeroizing handle has been operated said flat face of the rock shaft will have assumed such relationship to said blade as to obstruct the same and therefore prevent depression of any one of the keys F, as illustrated in Fig. 3.

It follows that erroneous results in registration due to simultaneous use of zeroizing handle and amount keys are effectively prohibited. It will be further understood that the relation of the pendant plates 25 and 26 to each other and to the key stems is such that the depression of one key locks all the others against depression and depression of two keys simultaneously is prevented.

I claim:

1. In a machine of the character described, the combination with registering wheels, means for registering varying amounts thereon, and means for zeroizing them; of means controlled by the wheel of highest order for preventing a second operation of the zeroizing means until that wheel reaches zero position.

2. In a machine of the character described, the combination with registering wheels, means for individually advancing them to register varying amounts, carrying mechanisms between the wheels, and means for zeroizing the wheels, the final step to zero of higher order wheels being derived from the carrying mechanisms; of means for preventing a second operation of the zeroizing means until the wheel of highest order reaches zero position.

3. In a machine of the character described, the combination with registering wheels, means for registering varying amounts therein, and means for zeroizing them including a reciprocating driver element; of a normally disabled blocking device for the latter adapted to be released by said element and again disabled by the wheel of highest order as the latter advances to zero position.

4. In a machine of the character described, the combination with registering wheels, means for registering varying amounts therein, and means for zeroizing them including a reciprocating driver element; of a blocking device for the latter, a latch normally disabling said blocking device, and adapted to be tripped by said driver element, and means for retracting the blocking device by the wheel of highest order as the latter advances to zero position.

5. In a machine of the character described, the combination with registering wheels, means for individually advancing them to register varying amounts, carrying mechanisms between the wheels, and means for zeroizing the wheels, the final step to zero of higher order wheels being derived from the carrying mechanisms; of means for preventing a second operation of the zeroizing means until the wheel of highest order reaches zero position, said preventing means including a blocking device normally latched out of effective position and adapted to be unlatched by the zeroizing means, and means in the nature of carrying mechanism controlled by the wheel of highest order and adapted to retract the blocking device.

6. In a machine of the character described, the combination with registering wheels, means for individually advancing them to register varying amounts, carrying mechanisms between the wheels, and means for zeroizing the wheels through reverse action of carrying-transmitting elements of said carrying mechanisms followed by carrying action thereof, said zeroizing means including a reciprocating driver element; of a blocking device for the latter, a latch normally disabling said blocking device and adapted to be tripped by the driver element, and means in the nature of carrying mechanism controlled by the wheel of highest order and adapted to retract the blocking devices.

7. The combination of register wheels; planetary gearing through which to individually advance them for registering varying amounts; carrying mechanism including cams and sun gears on the wheels, intermediate gears unified with the sun-gears of the first mentioned planetary gearing, oscillatory gear-carriers whose gears mesh with said sun-gears on the wheels and with the said intermediate gears, and gear-carrier oscillating members engaging the cams; zeroizing means including locks for the intermediate gears and a reciprocating driver element for operating said members independently of said cams to collectively advance the wheels toward zero through the reverse action of the wheels' gears, the gears of said carriers and the locked intermediate gears; and means for preventing a second operation of said driver element until completion of carry-transmission as instituted by advance of the wheel of lowest order to zero and the other wheels to positions one step short of zero through said reverse gear action, said means comprising a movable stop-piece to block said driver element, a latch normally restraining said stop-piece and adapted to be tripped by said driver element, a lever for retracting the stop-piece, a gear wheel equipped to operate said lever, a cam and sun gear on the wheel of highest order, an oscillatory gear carrier whose gears mesh with said last mentioned gear wheel and sun gear, and a gear carrier oscillating member engaging said cam on the wheel of highest order and operated upon by the zeroizing driver element.

8. The combination of depressible keys; coöperatively related lock pieces to compel depression of keys singly; a zeroizing driver element; a latch therefor; a spring for retracting the latch, the driver element normally restraining the spring; and connections between the latch and the key lock pieces including a member blocked by said pieces when displaced by depression of a key and blocking the lock pieces when the said driver element is unlatched.

9. The combination of depressible keys, abutting swinging lock pieces associated therewith, a rock-shaft with a flattened face confronting a terminal lock-piece; a zeroizing handle-lever; a latch lever for engaging the same, and a branch of which is normally engaged by the handle lever; a spring applied to the latch lever and normally restrained by the last mentioned engagement; and a link connecting the latch lever to an arm of the aforesaid rock shaft.

ALLEN A. HORTON.

Witnesses:
 R. S. MIELERT,
 J. A. BROPHY.